Patented Jan. 15, 1929.

1,698,715

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR CONTROLLING THE VULCANIZATION OF RUBBER AND SIMILAR MATERIALS AND PRODUCTS OBTAINED THEREBY.

No Drawing. Application filed June 25, 1923, Serial No. 647,757. Renewed July 12, 1928.

This invention relates to processes for controlling the vulcanization of rubber and similar materials such as balata, gutta percha and synthetic rubber, and products obtained thereby. It is more particularly directed to processes for checking such vulcanization of rubber or the like combined with a vulcanizing agent, a material containing carbon disulphide, zinc or equivalent metal in combination and an amine or any one or more of such substances, and causing vulcanization thereafter if desired; and to products obtained thereby.

The principal object of the present invention is to provide a process for checking the vulcanization of rubber which shall be simple and efficient, particularly in causing sure curbing or checking of vulcanization of rubber in any form including latex, cements or solid rubber whether applied to untreated rubber before vulcanization, to rubber containing one or more vulcanizing or other ingredients, or to rubber which has been partially or completely vulcanized while permitting easy resumption of vulcanization, at normal temperature (70° F.) or above, say 212° F., or 240–286° F., later if desired. Another object of the invention is to provide a series of products resulting from such processes in which such control has been exercised and which therefore may be more readily manipulated in factory processes without danger of prevulcanization and which will result in rubber articles having improved physical charactersistics such as better resistance to ageing.

The invention accordingly comprises a process for controlling the vulcanization of rubber which includes causing a vulcanizing ingredient contained in rubber to react with a substance for checking the vulcanizing function of the ingredient and at will treating the rubber with an agent causing vulcanization, and the products obtained thereby.

The term "agent" as herein employed is intended to include both chemical substances and physical forces such as heat.

The term "vulcanizing ingredient" as employed herein is intended to include a substance which is a component part of any combination or mixture which is capable of vulcanizing rubber.

In accordance with copending application No. 574,780, filed July 13, 1922, continued in applications Nos. 41,875, filed July 6, 1925, 681,066, filed Dec. 17, 1923, and application No. 574,797, filed July 13, 1922, now Patent No. 1,463,794, it has been shown that vulcanization at ordinary temperatures, approximately 70° F., occurs when four ingredients, M in combination, an amine, a material comprising sulphur and a material comprising carbon disulphide or carbon oxysulphide are present. (Above the ordinary temperature, say ranging upwards to 212° F. or 240–286° F. vulcanization in the presence of these substances occurs at an increased rate.) M represents zinc or mercury in the mercuric state when vulcanization at ordinary temperatures, approximately 70° F., is carried out, and when vulcanization above ordinary temperatures, the preferred metals are the following:—zinc, mercury, preferably in the mercuric state, cadmium, copper, preferably in the cupric state, arsenic, preferably in the arsenous state, manganese, preferably in the manganous state and lead preferably in the plumbous state. It has been found in accordance with the present invention that the vulcanization accomplished by the presence of these ingredients may be controlled by controlling the vulcanizing function of any one of the ingredients by treating it, preferably in rubber, with a substance which reacts chemically therewith, preferably without removing the reaction product where solid rubber is employed although it may be removed later if desired, and that after such treatment to check the function, the vulcanization may be carried on in the presence of the other ingredients by the application of heat or by replacing the ingredient which was reacted upon by the same or another quantity of the same ingredient or another similar ingredient. The control of vulcanization in the manner constituting the present invention is particularly important in its action to prevent the premature vulcanization of rubber compounds containing accelerators and other vulcanizing ingredients which vulcanize at ordinary temperatures or slightly above. Taking the process of vulcanization set forth in Cadwell's copending application, Sr. No. 441,691, filed February 1, 1921, in which rubber, zinc oxide, sulphur and oxy normal butyl thiocarbonic acid disulphide are combined and the compound so formed subsequently exposed to the vapors of aniline, constituting the fourth, i. e. amine ingredient, to effect vulcanization, if this compound without exposure to aniline or other amine be allowed to stand for a period of time at ordinary temperatures vulcanization is apt to occur, due it is believed to the action of the natural amine occurring in the rubber or to casual amine such as aniline picked up from the atmosphere of the factory, either of which may furnish the fourth ingredient required for vulcanization at ordinary temperature. The premature vulcanization mentioned occurs for instance in scrap rubber, that is pieces of rubber—usually small pieces—resulting from cutting or other processes for the manufacture of various rubber articles. By the present invention such premature vulcanization is avoided. If the premature vulcanization mentioned occurs it causes a serious loss of money in factory operations. Furthermore if vulcanized rubber is treated by the present process to check further vulcanization of the rubber, it has been found that further vulcanization substantially does not occur and thereby the ageing properties of the rubber are greatly improved. In addition it has been found that the process may be applied to various types of raw rubber to produce a uniformity of vulcanization therein, for example various lots of smoked sheet vulcanize it has been found at varying speeds. By the application of the present process these varying speeds may be changed to a uniform speed. The uniformity of speed of vulcanization is important in that vulcanized articles having a uniform degree of vulcanization may be automatically secured.

Instead of causing reaction with natural or casual amine to occur in a compound containing rubber, zinc in combination, sulphur and oxy normal butyl thiocarbonic acid disulphide, either zinc in combination or the carbon disulphide-containing material for example oxy normal butyl thiocarbonic acid disulphide may be treated with a suitable substance to check its vulcanizing function. Upon suitable treatment thereafter vulcanization may be accomplished.

In general in treating rubber containing vulcanizing ingredients, the following procedures may be employed:

1. For controlling the vulcanization by influencing the action of an amine or other basic nitrogenous matter constituting one of the four ingredients mentioned above, the amine may be rendered partially or totally inactive by treating it with an aldehyde of the aliphatic or aromatic series, such as formaldehyde, benzaldehyde, acetaldehyde, etc., or may be treated with an acid anhydride such as phthalic anhydride, or with nitroso bodies such as para nitrosodimethylaniline, nitroso beta naphthol, para nitrosodiethylaniline, or quinone, or similar materials and other bodies having similar properties. These substances lower the basicity of the amine or other basic nitrogenous matter present. Where the amine or other basic nitrogenous matter is not one of the four ingredients but is used for example with zinc in combination and sulphur, the treatment with aldehyde actually increases the activity of the amine. But treatment with an anhydride such as phthalic anhydride or nitroso bodies or quinone or other bodies having similar properties checks the vulcanizing function of the amine.

2. For controlling the vulcanization by influencing the action of the carbon disulphide-containing material, an excess of either an aliphatic amine or ammonia or hydrogen sulphide may be employed. The amine employed should be a primary amine.

3. For controlling the vulcanization by influencing the action of the zinc or similar metal, hydrogen sulphide may be employed or similar substance to form a less active compound. The zinc sulphide formed when hydrogen sulphide is used is a less active form of zinc in combination.

4. For controlling vulcanization by influencing the action of sulphur where sulphur constitutes one of the four ingredients mentioned above various unsaturated bodies may be employed such as palm oil, rosin and pine tar.

The substances for controlling the vulcanizing functions of these various vulcanizing ingredients leave the rubber substantially unchanged physically. The rubber may be employed in various states such as latex, raw rubber, or products intermediate between latex and raw rubber, such as rubber sponge, as set forth in United States patents of Ernest Hopkinson, 1,423,525 and 1,423,526; rubber which has been compounded and is ready for vulcanization and partially or fully vulcanized rubber. The treatment with the various materials mentioned above may be accomplished in various ways, such as by mixing mechanically with the rubber either by milling or similar process or by stirring in latex or cement. Or the various substances either in the gaseous, liquid or solid state may be absorbed by latex, raw rubber, rubber sponge, cements or vulcanized or vulcanizing rubber.

The following procedures represent embodiments of our invention:

A. MIXING IN RUBBER LATEX OR RUBBER INCLUDING RUBBER CEMENT THE SUBSTANCE TO CHECK THE FUNCTIONING OF A VULCANIZING INGREDIENT.

1. *Mixing substance with solid rubber or cement to check functioning of amine.*

*Example 1.*—100 parts of rubber, 2 parts of zinc oxide, 2 parts of sulphur and 2 parts of oxy normal butyl thiocarbonic acid disulphide and 0.3 part of finely ground phthalic anhydride are mixed by milling. This material may be stored or manipulated substantially without the occurrence of vulcanization therein. The phthalic anhydride reacts with the natural or casual amine or other basic nitrogenous matter to lower the basicity thereof and the reaction product is preferably left in the rubber. Phthalic anhydride is substantially non-hygroscopic and so does not introduce undesirable moisture into the rubber. When it is desired to bring about vulcanization the compound is placed in a chamber and exposed to aniline vapor at a temperature of 140° F. for 14 hrs. at the end of which time vulcanization is accomplished.

Instead of the treatment with aniline vapors to accomplish vulcanization the compound may be immersed in a saturated aqueous solution of aniline for 12 hrs. and subsequently maintained at 212° F. in water or in air for 1 hr.

Instead of the treatment with aniline vapor to accomplish vulcanization a treatment with diethylamine vapor may be employed. In this case an amount of rubber is treated with an amount of diethylamine equivalent to 0.5% of the weight of the rubber.

Instead of treating the compound with aniline, diethylamine or the like thus replacing the ingredient whose vulcanizing function has been checked, heat alone may be employed. In carrying out the heat treatment the compound whose vulcanization has been checked by treatment with phthalic anhydride as above is placed in a chamber and maintained at a temperature of approximately 266° F. for 1 hr. at the end of which time vulcanization is accomplished. It will be observed that the quantity of phthalic anhydride may be varied as desired, and in general it has been observed that the larger the quantity of phthalic anhydride employed the more slowly vulcanization occurs at any temperature. If it is found for example that prevulcanization occurs in the milling of a compound containing any given amount of phthalic anhydride the addition of a further amount will avoid prevulcanization. Thereafter if aniline or other amine is combined with the compound vulcanization is caused with the usual rapidity as soon as the phthalic anhydride is neutralized.

It will be noted that various steps and processes set forth in my copending application Sr. No. 441,691, filed Feb. 1, 1921, may be used in conjunction with the present invention.

*Example 2.*—A compound made up of 100 parts of rubber, 10 parts of zinc oxide, 4 parts of oxy normal butyl thiocarbonic acid disulphide, 2 parts of sulphur and 0.1 part of phthalic anhydride is prepared in the form of a sheet 0.03 of an inch thick. The phthalic anhydride checks the functioning of any naturally occurring or casual amine in the compound so that premature vulcanization does not occur. A compound consisting of 100 parts of rubber, 10 parts of zinc oxide, 2 parts of sulphur and 4 parts of dibenzylamine is milled in the usual manner and sheeted out to a thickness of 0.03 inch. The two compounds are united in alternate layers in a similar manner to that set forth in my copending application last mentioned above. The amine from the compound penetrates into the oxy normal butyl thiocarbonic acid disulphide compound, neutralizing any excess of phthalic anhydride that may remain and activating the oxy normal butyl thiocarbonic acid disulphide to cause vulcanization. The oxy normal butyl thiocarbonic acid disulphide penetrates into the amine compound where it reacts with the zinc oxide, sulphur and amine to cause vulcanization.

*Example 3.*—Cement consisting of 100 parts of rubber, 2 parts of zinc oxide, 2 parts of sulphur and 2 parts of oxy normal butyl thiocarbonic acid disulphide, 0.3 part of phthalic anhydride and 800 parts of benzol will not vulcanize prematurely due to the fact that the phthalic anhydride checks the functioning of any naturally occurring or casual amine. Forms may be dipped in this cement and thereafter when desired vulcanized in aniline vapor, aniline water or diethylamine vapor or by heat as set forth under A—1 Example 1.

*Example 4.*—100 parts rubber, 100 parts zinc oxide, 2 parts of oxy normal butyl thiocarbonic acid disulphide, 2 parts sulphur, and 1 part of phthalic anhydride are mixed on the rolls in the usual manner to produce a white compound which does not vulcanize prematurely even though an excessive amount of zinc oxide as indicated is present. This compound is vulcanized by treating it as under A—1 Example 1. In the absence of the phthalic anhydride the excess of zinc oxide tends to cause rapid premature vulcanization. The possibility of using this large amount of zinc oxide makes it possible to produce white vulcanized articles which do not turn yellow in the sunlight as is the case where for example lithopone is employed.

*Example 5.*—100 parts of smoked sheet are mixed with 0.1 part of phthalic anhydride and 10 parts of sulphur vulcanized at 286° F. for 250 minutes. The phthalic anhydride as here employed reduces the accelerating capacity of the basic nitrogenous matter naturally occurring in the smoked sheet so that the vulcanization which occurs is carried out in the presence of altered nitrogenous matter, and causes vulcanization to occur at a uniform rate when compared with similarly treated lots of smoked sheet. The ability to secure uniform rate of vulcanization of different lots of smoked sheets it will be recognized is valuable commercially as the differences in rates of vulcanization of various lots makes necessary especial care in control of the time of vulcanization in factories.

If a more rapid vulcanization of smoked sheet is desired 100 parts of smoked sheet are mixed with 0.1 part of phthalic anhydride, 3 parts of sulphur, 10 parts of zinc oxide, and 0.5 part of the accelerating condensation product of acetaldehyde and aniline and vulcanized under 40 lbs. steam pressure for 60 minutes. The phthalic anhydride here employed neutralizes the effect of any naturally occurring basic nitrogenous matter. If another lot of smoked sheet be similarly treated for purposes of comparison it will be found that the rates of vulcanization and the amount of vulcanization is substantially the same in each case though the amounts of basic nitrogenous matter in the two lots may vary considerably.

A similar procedure employing larger or smaller quantities of phthalic anhydride or similar substance may be employed with various other types of rubber to secure uniform rates of vulcanization. For example 100 parts of sprayed rubber are combined with 2 parts of oxy normal butyl thiocarbonic acid disulphide, 2 parts of zinc oxide, and 2 parts of sulphur and 1 part of phthalic anhydride. The phthalic anhydride neutralizes the basic nitrogenous matter occurring in sprayed rubber including ammonia or ammonia reaction products which are present where ammonia is used as a preservative for the latex from which the sprayed rubber is made. If phthalic anhydride is not used in this compound, any ammonia present is apt to react with the oxy normal butyl thiocarbonic acid disulphide to alter the rate of vulcanization of the compound.

*Example 6.*—Instead of phthalic anhydride, 1.0 part of benzaldehyde is combined with 100 parts of rubber, 2 parts of zinc oxide, 2 parts of sulphur and 2 parts of oxy normal butyl thiocarbonic acid disulphide by milling. This material may be stored or manipulated substantially without the occurrence of vulcanization therein. The benzaldehyde reacts with natural or casual amine in the rubber. The reaction product is preferably left in the rubber. When it is desired to bring about vulcanization the compound is placed in a chamber and exposed to aniline vapor at a temperature of 140° F. for 14 hrs. at the end of which time vulcanization is accomplished. The other methods set forth in A—1 Example 1 may be employed instead of the treatment with aniline just mentioned.

*Example 7.*—Instead of 1.0 part of benzaldehyde 1.0 part of para nitrosodimethylaniline is combined with the rubber and other ingredients as given in Example 6 and the treatment thereafter indicated in Example 6 is followed with the result that satisfactory vulcanization is accomplished.

*Example 8.*—100 parts of rubber, 10 parts of zinc oxide, 6 parts of zinc butyl xanthogenate, 0.3 part of phthalic anhydride are mixed on the rolls in the usual manner and treated with 800 parts of benzol to form a cement. The naturally occurring or casual amine in the rubber ordinarily tends to decompose the zinc butyl-xanthogenate. The phthalic anhydride neutralizes such amine and thus prevents decomposition of the zinc butylxanthogenate. This cement may be vulcanized by mixing it with an equal part of cement made up of 100 parts of rubber, 6 parts of sulphur, 3 parts of dibenzylamine and 800 parts of benzol.

The phthalic anhydride preserves zinc dithiobenzoate in the same way.

*2. Mixing substance with rubber to check functioning of the sulphur.*

Mix by milling 100 parts of rubber, 2 parts of zinc oxide, 2 parts of oxy normal butyl thiocarbonic acid disulphide and 2 parts of sulphur with 5 parts of palm oil. This material may be stored or manipulated as desired. Palm oil is an unsaturated compound which checks the vulcanizing action of the sulphur. Vulcanization of this compound is partially checked by the presence of the palm oil. Vulcanization may be resumed by placing the rubber in a receptacle containing aniline vapor heated to 140° F. for 14 hrs. whereupon satisfactory vulcanization is secured or by the other methods mentioned in A—1 Example 1.

*3. Mixing substance with latex containing zinc in combination to check functioning of the zinc.*

Mix latex preserved with 0.25% or more of ammonia sufficient to produce 100 parts of dry rubber with 1.5 parts of tetramethylthiuramdisulphide, 2 parts of zinc oxide, 3 parts of sulphur and 4 parts of ammonium sulphide. Vulcanization of the rubber obtained from this mixture by coagulation or otherwise is appreciably retarded. It may be resumed by adding 2 parts of zinc oxide and 1.5 parts of tetramethylthiuramdisulphide and heating the mixture to 212° F. for 60 minutes.

The above procedure finds special application in the production of thread. In the preparation of thread a mixture similar to the above without ammonium sulphide is employed. If for any reason a stoppage of the thread making machine occurs a supply of the latex thus compounded is on hand. 4 parts of ammonium sulphide may be added thereby preventing occurrence of vulcanization of the mass and rendering the latex available for other use.

B. INTRODUCING INTO RUBBER BY DIFFUSION A SUBSTANCE TO CHECK THE FUNCTIONING OF A VULCANIZING INGREDIENT.

1. *Introducing substance into rubber by diffusion to check functioning of amine.*

*Example 1.*—100 parts of rubber containing natural or casual amine, 2 parts of zinc oxide, 2 parts of sulphur and 2 parts of oxy normal butyl thiocarbonic acid disulphide is maintained over night in a receptacle of appropriate size to which has been added an amount of formaldehyde equal to 0.01 part of the weight of the rubber being treated. Formaldehyde is preferably introduced in the gaseous form which may be produced in any desired manner. If large amounts of rubber and large receptacles are employed it is necessary to circulate the gases in order that all of the rubber may be exposed thereto. Since the formaldehyde penetrates the rubber in order to react with the amine, it is desirable that the rubber be exposed thereto in thin sheets, say 0.1 inch or less in thickness although other thicknesses may be employed if desired. After treatment with formaldehyde the gas is blown out of the receptacle and the treated rubber aerated in a current of air until the odor of formaldehyde is lost. The treatment just given retards the vulcanization of the compound. Thereafter vulcanization may be resumed by placing the rubber in a receptacle containing aniline vapor heated to 140° F. for 14 hrs. whereupon vulcanization is completed. The various methods mentioned under A—1 Example 1 may be employed here if desired.

*Example 2.*—Rubber obtained by spraying whether in the form of rubber sponge or in compressed form in thin sheets, say 0.1 inch in thickness is treated for 12 hrs. with 0.05 of its weight of formaldehyde. The formaldehyde penetrates the rubber and reacts with any remaining ammonia or primary amine. The ammonia or primary amine if present in too large an amount tends to decompose certain disulphide accelerators, such as oxy normal butyl thiocarbonic acid disulphide. Thereafter 100 parts of such rubber are combined with 2 parts of oxy normal butyl thiocarbonic acid disulphide, 2 parts of zinc oxide, 2 parts of sulphur and vulcanized by any of the methods set forth in A—1 Example 1.

*Example 3.*—If desired an aldehyde, which due to the fact that it exists as a liquid at ordinary temperature and is therefore not so apt to leave the rubber as formaldehyde may be introduced into the rubber. Such an aldehyde is benzaldehyde. It may be introduced as follows: 100 parts of rubber which may contain casual amine or which may subsequently absorb a casual amine are mixed with 2 parts of zinc oxide, 2 parts of oxy normal butyl thiocarbonic acid disulphide and 2 parts of sulphur. This compound preferably in the form of masses of approximately 0.1 inch thickness or less is maintained over night in a receptacle containing benzaldehyde liquid whose vapors at ordinary temperature are distributed about the receptacle and penetrate the rubber mass, reacting with any casual amine already present. Thereafter the rubber so compounded is removed and a quantity of benzaldehyde remains therein so that any casual amine that may come in contact with the rubber will be neutralized by the benzaldehyde present. The vulcanization of the compound is accordingly retarded. Vulcanization may be resumed by placing the compound in a receptacle containing aniline vapor heated to 140° F. for 14 hrs. whereupon vulcanization is completed. Or any of the procedures mentioned under A—1 Example 1 may be used.

*Example 4.*—Instead of benzaldehyde, paranitrosodimethylaniline in solid form may be introduced in the receptacle mentioned in the above Example 3. At ordinary temperature this material volatilizes sufficiently to be absorbed by the rubber. Amounts of benzaldehyde or paranitrosodimethylaniline are employed to permit absorption by the rubber of a sufficient amount to react with the amine with an excess remaining at the end of the period of exposure.

*Example 5.*—The process may also be carried out by using vulcanized rubber resulting from the vulcanization of a compound made up from 100 parts of rubber, 10 parts of zinc oxide, 2 parts of dibenzylamine and 6 parts of sulphur vulcanized by treatment with the mixed vapors of carbon disulphide and carbontetrachloride at 180-200° F. as disclosed in my application Serial No. 574,797, filed July 13, 1922, now Patent No. 1,463,794. After treatment with carbon disulphide and carbon tetrachloride as indicated the vulcanized rubber is treated with 0.01 part of its weight of formaldehyde as described in B—Example 1. Without such treatment the compound will continue to vulcanize until practically all six parts of the sulphur have combined with the rubber thus producing an over-vulcanized product. By the process given vulcanization is substantially retarded and over-vulcanization of the material is reduced.

*Example 6.*—As another example employing vulcanized rubber derived from latex for instance, combined with various vulcanizing ingredients, the following process may be carried out:—Latex sufficient to produce 100 parts of dry rubber is compounded with 0.5 part of zinc oxide, 1.5 parts of zinc dimethyldithiocarbamate, 6 parts of sulphur, and vulcanized at 212° F. for approximately 1 hr. at the end of which time the vulcanized compound in sheets or threads 1/10" in thickness or less is treated with hydrogen sulphide gas at ordinary temperatures, 70° F., for 24 hours. The hydrogen sulphide reacts with zinc oxide and zinc dimethyldithiocarbamate to check their vulcanizing function. In this way over-vulcanization of the compound is checked.

*2. Introducing substance into rubber by diffusion to check functioning of carbon disulphide.*

Scrap rubber, that is compounded rubber resulting from the manufacture of articles and consisting of 100 parts of rubber, 2 parts of oxy normal butyl thiocarbonic acid disulphide, 2 parts of zinc oxide, and 2 parts of sulphur which may contain casual amine or which may subsequently absorb such amine, is treated with 14% aqueous solution of ammonia in which it is allowed to remain for from 24 to 36 hrs. The compound is removed and dried at ordinary temperatures. By this process oxy normal butyl thiocarbonic acid disulphide is decomposed without vulcanization of the rubber, and vulcanization is thereby checked. Vulcanization may be resumed by milling or otherwise adding 2 parts of oxy normal butylthiocarbonic acid disulphide and subsequent exposure to aniline vapor at 140° F. for 14 hrs. Instead of immersing the stock to be treated in an aqueous solution of ammonia it may be kept in ammonia gas for from 24 to 36 hrs. at ordinary temperatures. It is pointed out that with a certain concentration of ammonia, the rubber compound will vulcanize under the action thereof acting in this instance as a substitute for the later applied aniline. But where employed as in the example given no such vulcanization occurs and the decomposition of the oxy normal butyl thiocarbonic acid disulphide proceeds.

*3. Introducing substance into rubber by diffusion to check functioning of sulphur.*

100 parts of rubber, 10 parts of zinc oxide, 10 parts of oxy normal butyl thiocarbonic acid disulphide which may contain casual amine or which may subsequently absorb such amine is treated with 14% aqueous solution of ammonia and is allowed to remain for from 24 to 36 hrs. The compound is removed and dried at ordinary temperatures. The vulcanizing action of the oxy normal butyl thiocarbonic acid disulphide is thereby checked. According to my copending application Sr. No. 528,278, filed January 10, 1922, oxy normal butyl thiocarbonic acid disulphide acts as a vulcanizing agent furnishing sulphur to accomplish vulcanization. After retarding vulcanization it may be carried on by the addition of 10% of oxy normal butyl thiocarbonic acid disulphide and subsequent exposure to aniline vapor at 140° F. for 14 hrs. or by the other methods given under A—1 Example 1.

*4. Introducing substance into rubber by diffusion to check functioning of zinc.*

100 parts of rubber, 2 parts of zinc oxide, 2 parts of oxy normal butyl thiocarbonic acid disulphide, 2 parts of sulphur, are mixed by milling or otherwise. This compound in the from of masses of 0.1 inch thickness or less is placed in an atmosphere containing an excess of hydrogen sulphide gas for 24 hrs. whereupon it is removed. The zinc oxide reacts to form zinc sulphide which is a less active form of vulcanizing ingredient, and accordingly vulcanization of the mass is checked. The oxy normal butyl thiocarbonic acid disulphide is also decomposed. Vulcanization may be resumed by mixing 2 parts each of zinc oxide and oxy normal butyl thiocarbonic acid disulphide with the compound so treated and upon exposure of this mass to aniline vapor at 140° F. for 14 hrs. vulcanization is secured. Or the other methods given under A—1 Example 1 may be used.

The above procedure is particularly valuable where it is desired to temporarily discontinue the use of a compound such as given above, including rubber, zinc oxide, oxy normal butyl thiocarbonic acid disulphide and sulphur and to store the rubber until vulcanization thereof is to be carried out.

Instead of oxy butyl thiocarbonic acid disulphide mentioned in any of the above examples, the following vulcanizing ingredients may be substituted to be treated by the processes before mentioned herein: Zinc butyl xanthogenate, thiobenzoylmonosulphide, oxy ethylthiocarbonic acid disulphide and zinc dithiobenzoate in compounds or cements. The proportion of each of these materials preferably employed is as follows: 100 parts of rubber, 10 parts of zinc oxide, 3 parts of sulphur and from 0.1 to 3 parts of the zinc butyl xanthogenate, thiobenzoylmonosulphide, oxy ethylthiocarbonic acid disulphide or zinc dithiobenzoate.

It will be observed that oxy normal butyl thiocarbonic acid disulphide, zinc dithiobenzoate, zinc butyl xanthogenate, thiobenzoylmonosulphide, oxy ethylthiocarbonic acid disulphide are representatives of a large class of materials whose action may be controlled in a manner similar to that above set forth. This class of materials includes thiol salts, disulphides and monosulphides some of which are set forth in my Patents 1,440,962, 1,440,963, 1,440,964, 1,440,961, and my applications Sr. Nos. 548,828, 548,829, 548,831, now issued as U. S. Patents 1,532,226, 1,532,227, and 1,510,652, respectively. In the patents herein mentioned and in general where it is desired to control the vulcanization of rubber by chemically treating vulcanizing ingredients or particularly where it is desired to control the vulcanization of rubber containing sulphur and amine, zinc or equivalent metal, carbon dissulphide or materials containing the group $\overset{\text{CS}}{\underset{X}{\|}}$ where X represents sulphur or a substitute element or group the processes herein set forth may be employed.

The processes herein set forth are simple and efficient. They cause either partial or complete stoppage of vulcanization when applied to the various types of rubber employed containing one or more vulcanizing ingredients. They permit easy resumption of vulcanization later, if desired. Furthermore a uniform rate of vulcanization may be established for different lots of raw rubbers such as smoked sheet by the processes described. The products resulting from the process may be manipulated without fear of premature vulcanization and as a result the difficulty of producing scrap rubber in factory operations which vulcanized before it could be reformed into articles and which represented accordingly a loss has been done away with. Products in which over-vulcanization has been prevented by the processes herein included have a correspondingly increased resistance to ageing.

It will thus be seen that among others the objects of the invention above enumerated are achieved.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for controlling the vulcanization of rubber which comprises causing a "vulcanizing ingredient" contained in rubber to react with a substance for checking the vulcanizing function of the ingredient and at will treating the rubber with an agent causing vulcanization.

2. A process for controlling the vulcanization of rubber which comprises causing a vulcanizing ingredient contained in rubber to react with a substance for checking the vulcanizing action on the rubber of the ingredient without removing the ingredient from the rubber, treating the rubber with an agent to cause vulcanization, and vulcanizing the rubber.

3. A process for controlling the vulcanization of rubber which comprises causing a vulcanizing ingredient contained in rubber to react with a substance for checking the vulcanizing action on the rubber of the ingredient without removing the ingredient from the rubber, treating the rubber with a substance similar to the vulcanizing ingredient reacted upon, and vulcanizing the rubber.

4. A process for controlling the vulcanization of rubber which comprises causing a substance to react with one of four vulcanizing ingredients, amine, a substance containing the group $\overset{\text{CS}}{\underset{X}{\|}}$ sulphur and a metal M in combination to check the vulcanizing action on the rubber of the ingredient, treating the rubber with an agent to cause vulcanization of the rubber, and vulcanizing the rubber.

5. A process for controlling the vulcanization of rubber which comprises causing amine contained in rubber to react with a substance to check the vulcanizing function of the amine, treating the rubber with an agent to cause vulcanization, and vulcanizing the rubber.

6. A process for controlling the vulcanization of rubber which comprises causing an amine contained in rubber to react with an acid anhydride to check the vulcanizing action on the rubber of the amine, treating the rubber with an agent to cause vulcanization of the rubber, and vulcanizing the rubber.

7. A process for controlling the vulcanization of rubber which comprises causing an amine contained in rubber to react with phthalic anhydride to check the vulcanizing action on the rubber of the amine, treating the rubber with an agent to cause vulcanization, and vulcanizing the rubber.

8. A process for controlling the vulcanization of rubber which comprises causing an amine contained in rubber to react with an acid anhydride to check the vulcanizing action on the rubber of the amine, treating the rubber with an amine to counteract the checking effect of said anhydride by reaction of amine previously contained in the rubber, and vulcanizing the rubber.

9. A process for controlling the vulcanization of rubber which comprises causing an amine contained in rubber to react with phthalic anhydride to check the vulcanizing action on the rubber of the amine, treating the rubber with aniline, and vulcanizing the rubber.

10. A process for controlling the vulcanization of rubber which comprises causing a vulcanizing ingredient contained in rubber to react with a substance for checking the vulcanizing function of the ingredient, treating the rubber with an agent to cause vulcanization, and vulcanizing the rubber at a temperature below 240° F.

11. A process for controlling the vulcanization of rubber which comprises causing an amine contained in rubber to react with phthalic anhydride to check the vulcanizing function of the amine, treating the rubber with an agent to cause vulcanization below 240° F., and vulcanizing the rubber.

12. A process for controlling the vulcanization of rubber which comprises causing a reaction between a substance and amine contained in rubber, incorporating a material containing the group $\overset{CS}{\underset{X}{\|}}$ a material containing sulphur, and a metal M in combination, with the rubber, checking the vulcanizing action of the amine by the reaction, introducing amine into the rubber, and vulcanizing the rubber.

13. A process for controlling the vulcanization of rubber which comprises incorporating therewith phthalic anhydride, sulphur and the condensation product of acetaldehyde and aniline, and vulcanizing the rubber.

14. A process for controlling the vulcanization of rubber which comprises causing a reaction between a substance and amine contained in rubber, incorporating a material containing carbon disulphide, a material containing sulphur, and a metal M in combination, with the rubber, checking the vulcanizing action of the amine by the reaction, treating the rubber with amine, and vulcanizing the rubber.

15. A process for controlling the vulcanization of rubber which comprises causing a reaction between a substance and an amine contained in rubber, incorporating a material containing carbon disulphide, a material containing sulphur, and a metal M in combination, with the rubber, checking the vulcanizing action of the amine by the reaction, treating the rubber with aniline, and vulcanizing the rubber.

16. A process for controlling the vulcanization of rubber which comprises reacting upon an amine contained in rubber in the presence of oxy normal butyl thiocarbonic acid disulphide and zinc in combination, with an organic anhydride to check the action of the amine, replacing the amine in the rubber, and vulcanizing the rubber.

17. A process for controlling the vulcanization of rubber which comprises reacting upon an amine contained in a rubber compound in the presence of oxy normal butyl thiocarbonic acid disulphide and zinc in combination with phthalic anhydride to check the action of the amine, treating the rubber with amine, and vulcanizing the rubber.

18. A process for controlling the vulcanization of rubber which comprises reacting upon an amine contained in a rubber compound in the presence of oxy normal butyl thiocarbonic acid disulphide, sulphur and zinc in combination, with phthalic anhydride to check the action of the amine, treating the rubber with aniline at 140° F. for approximately 14 hours, to vulcanize the rubber.

19. A step in the process of vulcanizing rubber which comprises treating rubber containing zinc in combination, a material containing sulphur, a material containing carbon disulphide and phthalic anhydride with an aqueous solution of an aromatic amine.

20. A step in a process for treating rubber which comprises incorporating with rubber a substance adapted to react with basic nitrogenous material contained therein to lower the basicity thereof while preserving substantially unchanged the physical characteristics of the rubber.

21. A step in a process for treating rubber which comprises incorporating with one of the natural constituents thereof a substance adapted to alter the normal characteristics of such ingredient with respect to a member of the sulphur group while preserving the rubber substantially unchanged physically.

22. A step in the process of controlling the vulcanization of rubber which comprises treating amine contained in rubber with a substance for checking its vulcanizing function without removing the amine from the rubber.

23. A step in a process for treating rubber which comprises incorporating with rubber a non-hygroscopic anhydride adapted to react with the amine therein.

24. A process for treating rubber which comprises combining phthalic anhydride therewith.

25. Vulcanized rubber derived from rubber containing a vulcanizing ingredient reacted upon by a substance to check the vulcanizing function of the ingredient, and then with an agent to cause vulcanization.

26. Vulcanized rubber containing the reaction products of a vulcanizing ingredient and a substance to check the vulcanizing function of the ingredient.

27. Vulcanized rubber derived from rubber containing a vulcanizing ingredient reacted upon to form a reaction product by a substance to check the vulcanizing function of the ingredient, said reaction product being contained in said vulcanized rubber.

28. Vulcanized rubber derived from rubber containing a vulcanizing ingredient reacted upon by a substance to check the vulcanizing function of the ingredient and treated with a similar vulcanizing ingredient.

29. Vulcanized rubber containing the reaction product of a substance for retarding vulcanization reacted with one of four vulcanizing ingredients, an amine, a substance containing the group $\overset{CS,}{\underset{X}{\|}}$ sulphur and a metal M in combination.

30. Vulcanized rubber derived from rubber combined with a substance for retarding vulcanization reacted with one of four vulcanizing ingredients in the rubber, amine, carbon disulphide-containing material, sulphur and a metal M in combination, and then treated with a vulcanizing ingredient.

31. Vulcanized rubber containing the reaction product of an amine and phthalic anhydride to check the vulcanizing function of the amine.

32. Vulcanized rubber derived from rubber containing an amine combined with an acid anhydride and treated with an amine to cause vulcanization.

33. Vulcanized rubber derived from rubber containing an amine combined with an acid and anhydride and treated with aniline.

34. Vulcanized rubber containing a reaction product of amine and a substance for checking the vulcanizing action of the amine, a material containing the group $\overset{CS,}{\underset{X}{\|}}$ a material containing sulphur, and a metal M in combination.

35. Vulcanized rubber derived from rubber containing phthalic anhydride, sulphur and the condensation product of acetaldehyde and aniline.

36. Vulcanized rubber containing reaction product of amine and a substance for checking the vulcanizing action of the amine, a material containing the group $\overset{CS,}{\underset{X}{\|}}$ a material containing sulphur and a metal M in combination, and treated with aniline.

37. Rubber containing amine, oxy normal butyl thiocarbonic acid disulphide, zinc in combination and an acid anhydride, to check the action of the amine.

38. Rubber containing amine, oxy normal butyl thiocarbonic acid disulphide, zinc in combination and an acid anhydride to check the action of the amine, and treated with aniline to cause vulcanization.

39. Rubber containing amine, oxy normal butyl thiocarbonic acid disulphide, zinc in combination and phthalic anhydride to check the action of the amine.

40. Vulcanized rubber derived from rubber treated with a substance adapted to react with a basic nitrogenous material contained therein to lower the basicity thereof, preserving substantially unchanged the physical characteristics of the rubber.

41. Vulcanized rubber derived from rubber containing phthalic anhydride.

42. A process for vulcanizing rubber which comprises preparing a cement containing rubber, zinc in combination, sulphur, a material containing carbon disulphide and phthalic anhydride, preparing an article from the cement, and vulcanizing the article.

43. A process for controlling the vulcanization of rubber which comprises mixing rubber containing amine, oxy normal butyl thiocarbonic acid disulphide, sulphur and zinc oxide in excess to produce a white compound in the presence of phthalic anhydride, and subsequently vulcanizing the rubber in the presence of aniline.

44. A vulcanized white rubber compound derived from rubber containing amine mixed with oxy normal butyl thiocarbonic acid disulphide, sulphur, zinc oxide in excess to whiten the compound, and phthalic anhydride, treated with aniline.

Signed at New York, county and State of New York, this 21st day of June, 1923.

SIDNEY M. CADWELL.

CERTIFICATE OF CORRECTION.

Patent No. 1,698,715.                                                                          Granted January 15, 1929, to

SIDNEY M. CADWELL.

It is hereby certified that error appears in the printed specification of the above numbered patent requiring correction as follows: Page 7, lines 33 and 35, strike out the words "sub-sulphur or a"; and that the said Letters Patent should be read with this correction therein that the same may conform to the record of the case in the Patent Office.

Signed and sealed this 5th day of March, A. D. 1929.

(Seal)                                                                                   M. J. Moore,
                                                                                              Acting Commissioner of Patents.